US010094915B2

(12) United States Patent
Drader et al.

(10) Patent No.: US 10,094,915 B2
(45) Date of Patent: Oct. 9, 2018

(54) WRAP AROUND RANGING METHOD AND CIRCUIT

(71) Applicant: STMICROELECTRONICS (GRENOBLE 2) SAS, Grenoble (FR)

(72) Inventors: Marc Drader, Lans en Vercors (FR); Pascal Mellot, Lans en Vercors (FR)

(73) Assignee: STMICROELECTRONICS (GRENOBLE 2) SAS, Grenoble (FR)

(*) Notice: Subject to any disclaimer, the term of this patent is extended or adjusted under 35 U.S.C. 154(b) by 347 days.

(21) Appl. No.: 14/927,717

(22) Filed: Oct. 30, 2015

(65) Prior Publication Data

US 2016/0291138 A1    Oct. 6, 2016

(30) Foreign Application Priority Data

Apr. 2, 2015 (FR) ...................... 15 52861

(51) Int. Cl.
*G01S 7/48* (2006.01)
*G01S 7/486* (2006.01)
*G01S 17/08* (2006.01)
*G01S 17/10* (2006.01)
*G01S 13/22* (2006.01)

(52) U.S. Cl.
CPC .......... *G01S 7/4865* (2013.01); *G01S 7/4863* (2013.01); *G01S 17/08* (2013.01); *G01S 17/10* (2013.01); *G01S 13/227* (2013.01)

(58) Field of Classification Search
CPC .......... G01S 7/497; G01S 17/00; G01S 17/36; G01S 7/48
See application file for complete search history.

(56) References Cited

U.S. PATENT DOCUMENTS

| | | | | |
|---|---|---|---|---|
| 5,162,862 A | * | 11/1992 | Bartram | G01S 7/497 342/127 |
| 2004/0085526 A1 | | 5/2004 | Gogolla et al. | |
| 2006/0132754 A1 | | 6/2006 | Gogolla et al. | |
| 2008/0304043 A1 | | 12/2008 | Benz et al. | |
| 2014/0071433 A1 | * | 3/2014 | Eisele | G01S 7/4816 356/5.01 |

OTHER PUBLICATIONS

Rieger, "Range Ambiguity Resolution Technique Applying Pulse-Position Modulation in Time-of-Flight Scanning Lidar Applications," Optical Engineering 53(6), Jun. 2014, pp. 061614-1-061614-12.

* cited by examiner

*Primary Examiner* — Luke D Ratcliffe
(74) *Attorney, Agent, or Firm* — Slater Matsil, LLP

(57) ABSTRACT

A method is for estimating a distance to an object. The method may include determining, by a ranging device, a first range value based upon a time of flight of first optical pulses having a period of a first duration, and determining, by the ranging device, a second range value based upon a time of flight of second optical pulses having a period of a second duration different from the first duration. The method may include estimating the distance based upon the first and second range values.

19 Claims, 2 Drawing Sheets

WRAP AROUND RANGING METHOD AND CIRCUIT

RELATED APPLICATION

This application is based upon prior filed copending French Application No. 1552861 filed Apr. 2, 2015, the entire subject matter of which is incorporated herein by reference in its entirety.

TECHNICAL FIELD

The present disclosure relates to the field of ranging based upon a time of flight calculation, and in particular to, a circuit and method for determining the range of an object.

BACKGROUND

Single photon avalanche diode (SPAD) arrays can be used for a variety of applications, including ranging, Z (i.e. depth) or three-dimensional (3D) gesture recognition and for 3D imaging. A device for such applications generally comprises a light source for transmitting a light pulse into the image scene. The light reflected back from any object in the image scene is detected by the SPAD array, and is used to determine the time of flight of the light pulse. The distance from the object to the device can then be deduced based upon this time of flight.

The detection by the SPAD array of the returning light pulse is based upon event detection in the cells of the SPAD array. In particular, each cell will provide an output pulse when a photon is detected, and by monitoring the events, the arrival time of the return pulse can be estimated.

A difficulty in obtaining a valid range reading using a ranging device such as a SPAD array is that the dynamic range of the device is generally limited. In particular, a device such as a SPAD array operates by transmitting optical pulses at a certain period. The shorter this period, the faster the system will run, and thus the faster a range will be computed. However, the range that can be detected will also be lower, as the return optical pulse will have less time to return before a subsequent pulse is transmitted. Furthermore, the return pulse may be detected after a subsequent optical pulse has been transmitted, and may be mistaken for the return of the subsequent optical pulse, leading to an erroneous range value.

SUMMARY

Generally speaking, a method is for estimating a distance to an object. The method may include determining, by a ranging device, a first range value based upon a time of flight of a first plurality of optical pulses having a period of a first duration, and determining, by the ranging device, a second range value based upon a time of flight of a second plurality of optical pulses having a period of a second duration different from the first duration. The method may include estimating the distance based upon the first and second range values.

DETAILED DESCRIPTION

Figure 1:
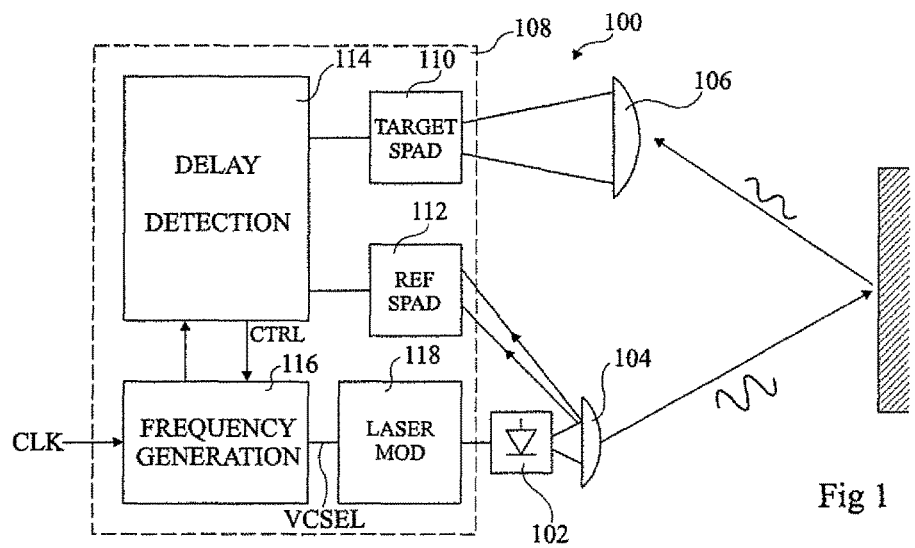
FIG. 1 is a schematic diagram of a SPAD device, according to an example embodiment of the present disclosure.

Throughout the present description, the term "connected" is used to designate a direct electrical connection between two elements, and the term "coupled" is used to designate an electrical connection between two elements that may be direct, or may be via one or more other components such as resistors, capacitors or transistors. Furthermore, as used herein, the term "substantially"/"around" is used to designate a range of +/−10 percent of the value in question. While in the present description, embodiments are described comprising a ranging device in the form of a SPAD array, the principles of the circuit and method described herein for calculating a distance to an object could be applied to any type of ranging device based upon a time of flight estimation.

Generally speaking, a method of estimating the distance to an object may include determining, by a ranging device, a first range value based upon a time of flight of a first plurality of optical pulses having a period of a first duration, and determining, by the ranging device, a second range value based upon a time of flight of a second plurality of optical pulses having a period of a second duration different to the first duration. The method may include estimating the distance based upon the first and second range values.

Also, the method may further comprise, before determining the second range value, comparing the first range value with a first threshold level, and selecting the second duration to be higher or lower than the first duration based upon the comparison. The estimated distance may be greater than a distance corresponding to either of the first and second range values. Estimating the distance based upon the first and second range values may comprise determining the lowest common multiple of the first and second range values, and converting the lowest common multiple into a distance value.

Additionally, the first duration may be equal to N periods of a clock signal, and the second duration may be equal to M periods of the clock signal, where N and M are non-equal integers. M may be selected to be equal to a value of ML clock periods or MH clock periods. ML may be lower than N, MH may be higher than N, and the first threshold level may be a maximum range value for a period of ML clock periods of the optical pulse.

Determining the range based upon the first and second range values may comprise incrementing the first range value by a range corresponding to N clock periods, and/or incrementing the second range value by a range corresponding to M clock periods. The first and second range values may be incremented until they become equal in value. The first plurality of optical pulses and the second plurality of optical pulses may each form a square-wave signal, a sine wave signal, a triangle wave signal, or a saw tooth wave signal.

Another aspect is directed to a circuit for estimating the distance to an object. The circuit may include a ranging device configured to determine a first range value based upon a time of flight of a first plurality of optical pulses having a period of a first duration, and a second range value based upon a time of flight of a second plurality of optical pulses having a period of a second duration different to the first duration. The circuit may include a processing circuit configured to estimate the distance based upon the first and second range values.

The ranging device may comprise at least one array of SPAD cells. The circuit may further comprise an optical pulse generation circuit configured to generate the first and second plurality of optical pulses. The processing circuit may be configured to compare the first range value with a threshold value, and to control the optical pulse generation circuit such that the second duration is selected, based upon the comparison, to be higher or lower than the first duration.

The estimated distance may be greater than a distance corresponding to either of the first and second range values. The processing circuit may be configured to estimate the distance based upon the first and second range values by determining the lowest common multiple of the first and second range values, and converting the lowest common multiple into a distance value. According to another aspect, an electronic device may comprise the above circuit, and a light source configured to transmit the first and second plurality of optical pulses.

FIG. 1 illustrates a SPAD device 100 implementing a ranging function. The device 100 comprises a light source 102, which is, for example, a laser, for generating a beam of light pulses transmitted into an image scene, or example via a lens 104. The return light pulses are, for example, received via a further lens 106.

The SPAD device 100 further comprises a detection circuit 108 for determining the distance between the device 100 and an object in the image scene against which the light pulses reflect. The detection circuit 108, for example, comprises a target SPAD array (TARGET SPAD) 110, which receives the return light pulses via the lens 106. The target SPAD array 110, for example, comprises an array of between four and several hundred SPAD cells. In one example, the array is a 12 by 12 array comprising 144 SPAD cells.

The detection circuit 108 also, for example, comprises a reference SPAD array (REF SPAD) 112, which is, for example, of the same dimensions as the target SPAD array 110, and receives an internal reflection of the transmitted light pulses. A delay detection circuit (DELAY DETECTION) 114 is, for example, coupled to the target SPAD array 110 and to the reference SPAD array 112, and estimates the delay between each transmitted light pulse and the return light pulse received by the target SPAD array 110. The detection circuit 108 also, for example, comprises a frequency generation circuit (FREQUENCY GENERATION) 116, which generates a voltage signal VCSEL provided to a laser modulation circuit (LASER MOD) 118 for generating a signal for driving the light source 102. The delay detection circuit 114, for example, provides a control signal CTRL to the frequency generation circuit 116 for controlling the period of the signal VCSEL.

Figure 2:
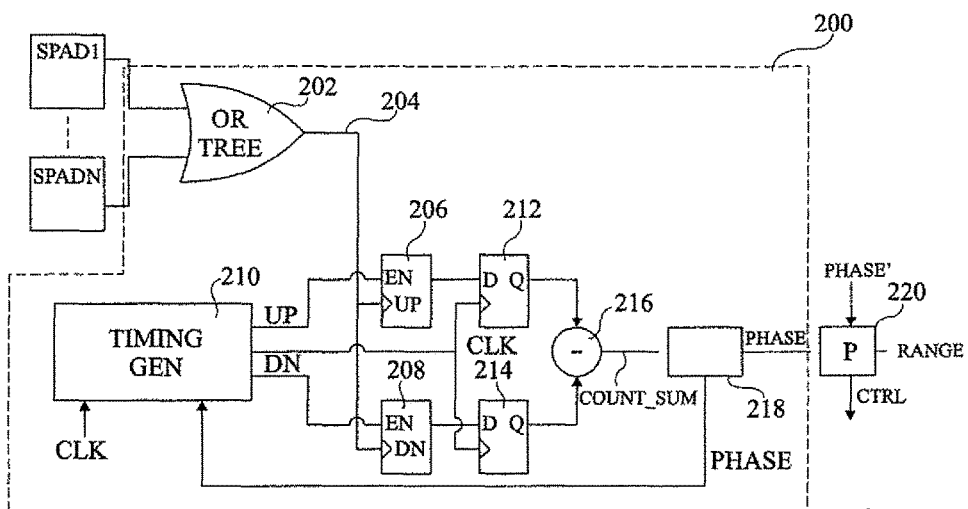
FIG. 2 is a schematic diagram of a delay detection circuit of FIG. 1 in more detail.

FIG. 2 shows a circuit 200 forming part of the delay detection circuit 114 of FIG. 1. The circuit 200 receives signals from the cells of the target SPAD array 110. A similar circuit is, for example, provided for receiving the signals from the cells of the reference SPAD array 112.

The circuit 200, for example, comprises an OR tree (OR TREE) 202 having inputs respectively coupled to each of the SPAD cells SPAD1 to SPADN of the array 110, and providing, on its output line 204, pulses generated each time an event is detected by one of the SPAD cells. The output line 204 is coupled to counters for counting the detected events. In the example of FIG. 2, the output line is coupled to the clock input of an up counter (UP) 206 and of a down counter (DN) 208. The up counter 206 is enabled during an up count period, based upon a signal UP received from a timing generation circuit (TIMING GEN) 210, which receives a clock signal CLK. Similarly, the down counter 208 is enabled during a down count period, based upon a signal DN received from the timing generation circuit 210. The output of the counter 206 is, for example, clocked by a flip-flop 212 based upon the clock signal CLK, and the output of the counter 208 is, for example, clocked by a flip-flop 214 based upon the clock signal CLK. A difference between the outputs of the flip-flops 212 and 214 is generated by a subtraction unit 216 to provide a signal COUNT_SUM. This signal is analyzed by an analysis circuit 218 in order to generate a phase signal (PHASE), which is provided to the timing generation circuit 210 and used to determine the timing to be applied for a subsequent detection cycle.

The phase signal from the circuit 200 is, for example, provided to a processing circuit (P) 220, which generates the control signal CTRL to the frequency generation circuit 116 of FIG. 1 for controlling the period of the signal VCSEL. The processing circuit 220 also, for example, receives a phase signal PHASE' generated based upon the signal received by the reference SPAD 112. The processing circuit 220, for example, determines a range value RANGE based upon the phase signals PHASE and PHASE' for a plurality of VCSEL periods, as will be described in more detail below.

Figure 3:
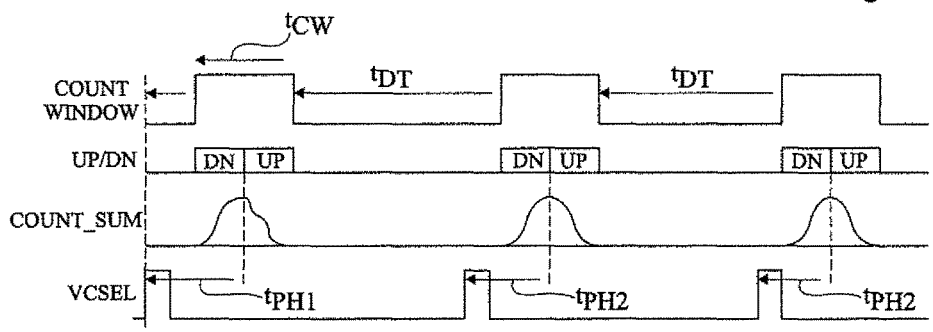
FIG. 3 is a timing diagram representing examples of signals in the circuit of FIG. 2.

FIG. 3 shows a count window (COUNT WINDOW) of the counters 206, 208 of FIG. 2, the signals DN and UP controlling the counters 206, 208, the signal COUNT_SUM, and the signal VCSEL used to generate the optical pulses. The count window for each detection phase, for example, has a duration tCW, and the count windows are separated by dead time periods of duration tDT during which the counters 206, 208 are disabled. The sum of the durations tCW and tDT is equal to the optical pulse period, in other words the period of the signal VCSEL.

The signal DN is, for example, asserted during the first half of the count window, and the signal UP is, for example, asserted during the second half of the count window. The signal VCSEL is, for example, the signal used to generate the transmitted light pulses, and thus, a time difference between this pulse and the center of the count window, averaged over several detection phases, can be used to determine a first time delay between VCSEL and the return light pulse. In a similar fashion, a second time delay between VCSEL and the reference pulse is, for example, calculated. The difference between the first and second time delays is, for example, determined in order to estimate the time of flight.

Figure 4:
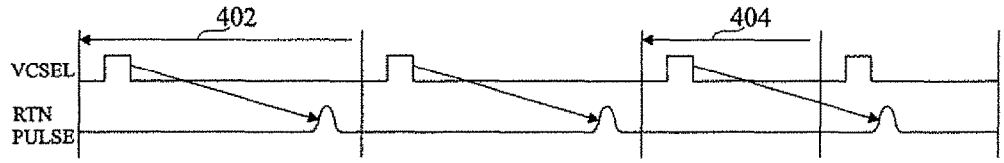
FIG. 4 is a timing diagram representing return signals, according to an example embodiment.

FIG. 4 shows the signal VCSEL used for generating the optical pulses, and the timing of the return pulses (RTN PULSE). In a first two detection phases represented in FIG. 4, the optical pulse period 402 is relatively long, for example, equal to 18 clock periods of the clock signal CLK (not illustrated in FIG. 4). A high pulse of the signal VCSEL, and thus the optical pulse transmission, for example, occurs near the start of each optical pulse period 402. The detected return pulse, for example, arrives near the end of the optical pulse period, and therefore in this example, a range can be determined.

However, in a subsequent two detection phases represented in FIG. 4, the optical pulse period is reduced to a value 404 having a relatively short duration, for example, equal to 10 clock periods. While the time of flight is the same as for the first two detection phases, the return pulse is now received during a subsequent optical pulse period, meaning that the phase value will be calculated as if the optical pulse was transmitted during the subsequent optical pulse period. This phenomenon will be referred to herein as "wrap around". Furthermore, in the example of FIG. 4, the optical pulse is received after the subsequent high pulse of VCSEL, and therefore the return pulse will generate a valid but erroneous range value, which will be lower than the true phase by a time value equal to the period 404 of the optical pulses.

While FIG. 4 illustrates a case in which an optical pulse transmitted in one optical pulse period is detected during a subsequent optical pulse period, for farther objects the return pulse could be detected in even later optical pulse periods. In the examples of FIGS. 3 and 4, the signal VCSEL is a square-wave signal, and the generated optical pulses, for example, also form a square-wave. However, in alternative embodiments, the signal VCSEL used to generate the optical pulses, and the optical pulses themselves, could have other forms. For example, the signal VCSEL and the optical pulses could form a continuous sine wave signal, having peaks that correspond to the optical pulses, and troughs in which the optical signal falls to zero. In such a case, the period of the optical pulse signal would be the period of the sine wave. As further examples, the signal VCSEL and the optical pulses could be in the form of triangle or saw tooth waves in which the peaks of these signals form the optical pulses.

Figure 5:
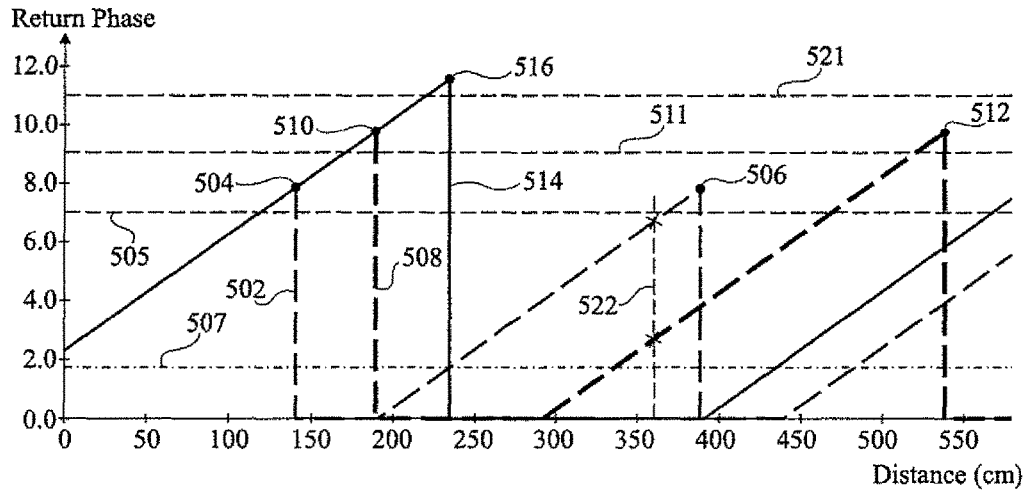
FIG. 5 is a graph representing a return phase value as a function of distance for three different capture periods, according to an example embodiment.

A method for determining the true range in situations like that of FIG. 4 will now be described with reference to FIGS. 5, 6A and 6B. FIG. 5 shows the return phase, represented in clock periods of the clock signal CLK, for object distances up to 600 cm, and for three optical pulse periods. As used herein, the term "range" is used to designate the return phase value, which may be erroneous, and the term "actual distance" is used to designate the actual distance to the object.

For example, a dashed curve 502 represents the return phase for an optical pulse period of 10 clock periods of CLK. Such an optical pulse period, for example, provides range values up to a limit 504 corresponding, for example, to an actual distance of around 140 cm. However, to reduce the risk of clipping, an upper limit represented by a dashed line 505 is, for example, applied to the range values generated for the curve 502, for example, corresponding to an actual distance of around 115 cm. Furthermore, after wrap around, range values are, for example, obtained corresponding to actual distances from around 195 cm up to a limit 506 corresponding, for example, to an actual distance of around 380 cm. However, to avoid clipping, a lower limit 507 is, for example, applied in addition to the upper limit 505, leading to valid ranges corresponding to actual distances of around 240 cm to around 365 cm. Similarly, valid range values are then obtained again for distances from around 480 cm, up to a limit not illustrated in FIG. 5. The curve 502, for example, repeats in this periodic manner up to a transmission distance limit of the optical pulse, which is, for example, at around 13 m, but could be higher.

A dotted curve 508 represents the return phase for an optical pulse period of 14 clock periods of CLK. Such an optical pulse period, for example, provides range values up to a limit 510 corresponding, for example, to an actual distance of around 190 cm, but again an upper limit represented by a dashed line 511 is, for example, applied to avoid clipping, leading to a valid range being available for actual distances up to around 165 cm. Furthermore, after wrap around, and in view of the lower and upper limits 507, 511, a valid range is, for example, obtained for the actual distance of around 330 cm up to a limit 512 corresponding, for example, to an actual distance of around 540 cm. The curve 508, for example, repeats in this periodic manner up to the transmission distance limit of the optical pulse.

A solid line curve 514 represents the return phase for an optical pulse period of 18 clock periods of CLK. Such an optical pulse period, for example, provides range values up to a limit 516 corresponding, for example, to an actual distance of around 230 cm, but again an upper limit represented by a dashed line 521 is, for example, applied to avoid clipping, leading to a valid range being available for actual distances up to around 220 cm. Furthermore, after wrap around, a valid range is, for example, obtained for the actual distance of around 430 cm up to a limit higher than 6 m and not illustrated in FIG. 5. The curve 514, for example, repeats in this periodic manner up to the transmission distance limit of the optical pulse.

As it can be seen from FIG. 5, for most distances, there will be at least two valid range readings, in other words at least two valid return phases. A method of determining the actual distance of an object is, for example, based upon at least two range values obtained using different optical pulse periods, as will now be described with reference to FIGS. 6A and 6B.

Figure 6A:
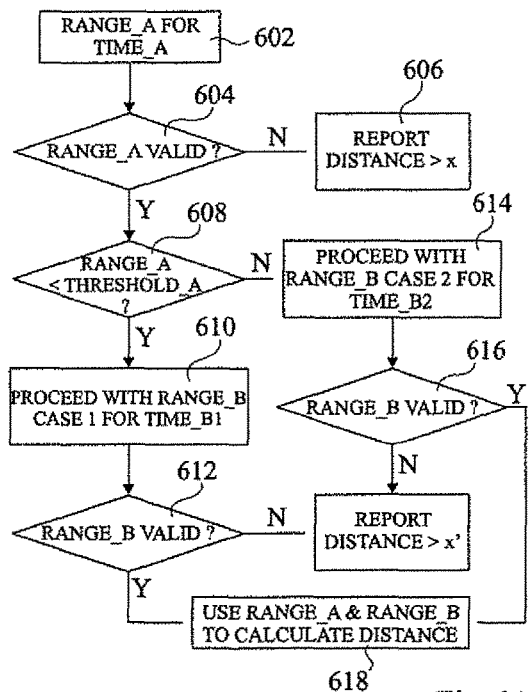
FIG. 6A is a flowchart showing a method of determining a range of an object, according to an example embodiment.

FIG. 6A is a flowchart showing operations in a method of determining the distance of an object according to an example embodiment. This method is, for example, implemented in hardware, or by software executed by a processing device, in the processing circuit 220.

In an operation 602, a first range "RANGE_A" is determined using an optical pulse period of TIME_A. This optical pulse period is, for example, an intermediate level among the possible periods that can be selected by the ranging device. For example, if the ranging device is capable of using one of three different optical pulse periods, TIME_A, for example, corresponds to the intermediate pulse period. In an example in which the optical pulse periods are equal to 10, 14 and 18 clock periods, TIME_A, for example, corresponds to the 14 clock period value.

In subsequent operation 604, it is determined whether the range of value RANGE_A is valid. For example, if no phase reading can be made, the ranging device, for example, outputs an error code, indicating that the range value is invalid. Additionally or alternatively, the return phase is compared with the upper and lower thresholds represented by the line 507 in FIG. 5. If the phase is outside the limits set by these thresholds, the range is determined to be invalid, and in a subsequent operation 606, the distance is reported as being greater than x, where x is, for example, the highest distance that can be reliably determined using an optical pulse period of duration TIME_A. In the example of FIG. 5, x is, for example, chosen to be around 125 cm.

If a valid range is obtained in operation 604, in a next operation 608, the range value RANGE_A is compared to a threshold THRESHOLD_A. This threshold, for example, corresponds to the range of the dashed line 505 in FIG. 5, which is slightly lower than the limits 504, 506 etc. for an optical pulse period of 10 clock periods.

In the case that the range value RANGE_A is lower than the threshold, in a next operation 610, a new range RANGE_B is determined by the ranging device using an optical pulse period of duration TIME_B1, where the duration TIME_B1 is lower than duration TIME_A. This is, for example, achieved by transmitting, by the processing circuit 220, an appropriate control signal CTRL to the frequency generation circuit 116 of FIG. 1. The duration TIME_B1 for example, corresponds to 10 clock periods in the example of FIG. 5. In a subsequent operation 612, it is then determined whether or not the range value RANGE_B is valid, for example, in the same manner as described above with reference to operation 604, but based upon the lower and upper limits 507 and 505 represented in FIG. 5.

Alternatively, in the case that, in operation 608, the range value "RANGE_A" is determined to be higher than the threshold value THRESHOLD_A, in a next operation is 614, a new range RANGE_B is determined by the ranging device using an optical pulse period of duration TIME_B2, where the duration TIME_B2 is higher than duration TIME_A. Again, this is, for example, achieved by transmitting, by the processing circuit 220, an appropriate control signal CTRL to the frequency generation circuit 116 of FIG. 1. The duration TIME_B2, for example, corresponds to 18 clock periods in the example of FIG. 5. In a subsequent operation 616, it is then determined whether or not the range value RANGE_B is valid, for example, in the same manner as described above with reference to operation 604, but based upon the lower and upper limits 507 and 521 represented in FIG. 5. The threshold THRESHOLD_A applied in operation 608 is, for example, chosen such that ranges below this threshold can be validly measured using optical pulses having the period TIME_B1.

If in operations 612 or 616, the range value RANGE_B is determined to be invalid, it is, for example, reported that the distance is greater than a distance x', where x' is, for example, equal to the same distance x of operation 606 if the optical pulse period was reduced to a duration TIME_B1, or equal to the highest distance that can be reliably determined using an optical pulse period of duration TIME_B2, for example, equal to around 2 m. If however the range is valid, in a subsequent operation 618, the distance is determined based upon the range values RANGE_A and RANGE_B. An example of implementation of the operation 618 will now be described with reference to FIG. 6B.

Figure 6B:
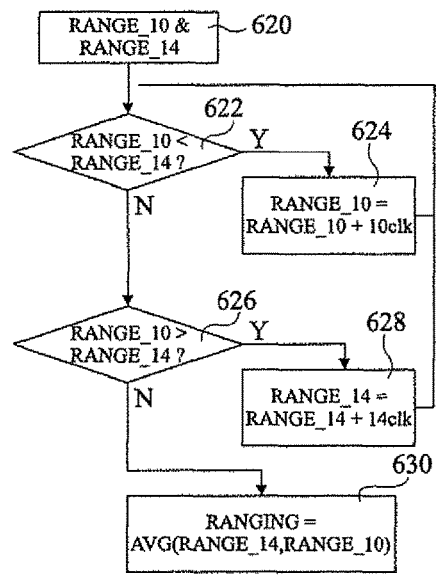
FIG. 6B is a flowchart showing the determination of a range based upon two range readings, according to an example embodiment.

FIG. 6B is a flowchart showing an example method of determining an object distance based upon two range values. The example of FIG. 6B is based upon the case that the range values RANGE_A and RANGE_B are respectively values RANGE_14 and RANGE_10 based upon optical pulse periods of 14 and 10 clock periods respectively, as shown at 620 in the figure. However, the same method could be applied to ranges generated based upon different periods of the optical pulses. It is assumed that each of the range values is represented by a number of clock periods as measured before taking into account the measured timing of the reference return pulse. In alternative embodiments, the method could be applied after the range values have been converted into distance values.

In an operation 622, it is determined whether the value RANGE_10 is less than the value RANGE_14. If so, the value of RANGE_10 is, for example, incremented by 10 clock periods in an operation 624, and then operation 622 is, for example, repeated. Operation 622 is repeated until the value of RANGE_10 is equal to or greater than the value of RANGE_14, and then the next operation is 626.

In operation 626, the value of RANGE_10 is again compared with the value of RANGE_14, and if it is greater, the next operation is 628, in which 14 clock periods are added to the value RANGE_14. Operation 622 is then, for example, repeated. Thus, the operations 622 and 626 will be repeated until the lowest common multiple of these range values is found, and then the next operation is 630. In operation 630, the range is determined as the average of the values RANGE_14 and RANGE_10.

As an example, the range value RANGE_10 is initially equal to 6.5, and the range value RANGE_14 is initially equal to 2.5, corresponding to an object distance of 360 cm shown by a dashed line 522 in FIG. 5. Thus, in operation 622, the value RANGE_10 is greater than the value RANGE_14, and therefore in operation 626, the value RANGE_14 is incremented by 14, leading to a value of 16.5. The method then returns to operation 622, where this time RANGE_14 (16.5) is greater than RANGE_10 (6.5), and therefore 10 is added to RANGE_10 in operation 624. Now the values RANGE_10 and RANGE_14 are equal, and thus in operation 630 the distance will correspond to a conversion of 16.5 into a distance value of around 360 cm. For example, the relation between distance and phase is given by the equation Distance=(Phase-offset) x F, where in the example of FIG. 5, the offset is equal to around 2, and the factor F is equal to around 25 cm. In some embodiments, the distance may be modified based upon a phase value of the reference return pulse detected by the reference SPAD array 112 of FIG. 1.

An advantage of the embodiments described herein is that the range of the ranging device can be significantly extended by benefitting from the wrap around effect and relying on more than one range value determined using optical pulse periods of different durations.

Having thus described at least one illustrative embodiment, various alterations, modifications and improvements will readily occur to those skilled in the art. For example, it will be apparent to those skilled in the art that using optical pulse periods of 10, 14 and 18 clock periods is merely one example, and many different values would be possible.

Furthermore, the generation of the optical pulse signal VCSEL based upon a number of clock periods is merely one example, and it will be apparent to those skilled in the art that alternative implementations would be possible for generating the optical pulse signal. Furthermore, it will be apparent to those skilled in the art that the various features described in relation to the various embodiments could be combined, in alternative embodiments, in any combination.

That which is claimed is:

1. A method for estimating a distance to an object, the method comprising:
   determining, by a ranging device, a first range value based upon a time of flight of a first plurality of optical pulses having a period of a first duration;
   comparing the first range value with a first threshold level;
   selecting a second duration to be higher or lower than the first duration based upon said comparison;
   determining, by the ranging device and after the comparison and the selecting, a second range value based upon a time of flight of a second plurality of optical pulses having a period of the second duration; and
   estimating the distance based upon the first and second range values.

2. The method of claim 1 wherein estimating the distance based upon the first and second range values comprises:
   determining a lowest common multiple of the first and second range values; and converting the lowest common multiple into a distance value.

3. The method of claim 1, wherein the first duration is equal to N integer periods of a clock signal; wherein the second duration is equal to M integer periods of the clock signal; and wherein N and M are non-equal integers.

4. The method of claim 3, wherein estimating the distance based upon the first and second range values comprises:
incrementing the first range value by a range corresponding to the N integer periods of the clock signal; and
incrementing the second range value by a range corresponding to the M integer periods of the clock signal.

5. The method of claim 4 wherein the first and second range values are incremented until the first and second range values become equal in value.

6. The method of claim 1 wherein the first plurality of optical pulses and the second plurality of optical pulses each comprises at least one of a square-wave signal, a sinewave signal, a triangle wave signal, or a sawtooth wave signal.

7. A circuit for estimating a distance to an object, the circuit comprising:
a detector circuit;
a ranging circuit coupled to said detector circuit and configured to
determine a first range value based upon a time of flight of a first plurality of optical pulses having a period of a first duration,
determine a second range value based upon a time of flight of a second plurality of optical pulses having a period of a second duration different from the first duration, and
estimate the distance based upon the first and second range values; and
an optical pulse generation circuit configured to generate the first and second plurality of optical pulses, wherein the ranging circuit is configured to compare the first range value with a threshold value, and to control the optical pulse generation circuit such that the second duration is selected, based upon the comparison, to be higher or lower than the first duration.

8. The circuit of claim 7 wherein said detector circuit comprises at least one array of single photon avalanche detector (SPAD) cells.

9. The circuit of claim 7 wherein the distance is greater than either of the first and second range values.

10. The circuit of claim 7 wherein said ranging circuit is configured to estimate the distance based upon the first and second range values by:
determining a lowest common multiple of the first and second range values; and
converting the lowest common multiple into a distance value.

11. The circuit of claim 7, wherein the first duration is equal to N integer periods of a clock signal; wherein the second duration is equal to M integer periods of the clock signal; and wherein N and M are non-equal integers.

12. The circuit of claim 11, wherein said ranging circuit is configured to estimate the distance based upon the first and second range values by at least:
incrementing the first range value by a range corresponding to the N integer periods of the clock signal; and
incrementing the second range value by a range corresponding to the M integer periods of the clock signal.

13. A device for estimating a distance to an object, the device comprising:
a light source;
a detector circuit; and
a ranging processor coupled to said detector circuit and said light source, said ranging processor configured to
determine a first range value based upon a time of flight of a first plurality of optical pulses having a period of a first duration,
determine a second range value based upon a time of flight of a second plurality of optical pulses having a period of a second duration different from the first duration, and
estimate the distance based upon the first and second range values, wherein estimating the distance comprises:
determining a lowest common multiple of the first and second range values; and
converting the lowest common multiple into a distance value.

14. The device of claim 13 wherein said detector circuit comprises at least one array of single photon avalanche detector (SPAD) cells.

15. The device of claim 13 wherein said ranging processor is configured to compare the first range value with a threshold value, and to control said light source such that the second duration is selected, based upon the comparison, to be higher or lower than the first duration.

16. The device of claim 13 wherein the distance is greater than either of the first and second range values.

17. The device of claim 15 wherein the first duration is equal to N integer periods of a clock signal; wherein the second duration is equal to M integer periods of the clock signal; and wherein N and M are non-equal integers.

18. The device of claim 17, wherein said ranging processor is configured to estimate the distance based upon the first and second range values by at least:
incrementing the first range value by a range corresponding to the N integer periods of the clock signal; and
incrementing the second range value by a range corresponding to the M integer periods of the clock signal.

19. The device of claim 18, wherein the first and second range values are incremented until the first and second range values become equal in value.

* * * * *